(12) United States Patent
Ostrowsky

(10) Patent No.: US 7,901,277 B2
(45) Date of Patent: Mar. 8, 2011

(54) DEVICE FOR RECEIVING AND FIXING FISH WITHIN A DEVICE FOR PROCESSING FISH

(75) Inventor: Peter Ostrowsky, Neustadt (DE)

(73) Assignee: Nordischer Mashinenbau Rud. Baader GmbH & Co. KG, Lübeck (DE)

( * ) Notice: Subject to any disclaimer, the term of this patent is extended or adjusted under 35 U.S.C. 154(b) by 0 days.

(21) Appl. No.: 12/681,443

(22) PCT Filed: Sep. 23, 2008

(86) PCT No.: PCT/EP2008/008212
§ 371 (c)(1),
(2), (4) Date: Apr. 2, 2010

(87) PCT Pub. No.: WO2009/046889
PCT Pub. Date: Apr. 16, 2009

(65) Prior Publication Data
US 2010/0216381 A1 Aug. 26, 2010

(30) Foreign Application Priority Data
Oct. 2, 2007 (DE) .......................... 10 2007 048 176

(51) Int. Cl.
*A22C 25/06* (2006.01)
(52) U.S. Cl. ........................................ 452/195
(58) Field of Classification Search .............. 452/52, 452/63, 64, 107, 108, 149–151, 153, 154, 452/163
See application file for complete search history.

(56) References Cited

U.S. PATENT DOCUMENTS

| 2,685,360 | A | | 8/1954 | Kaplan | |
| 3,843,998 | A | * | 10/1974 | Wenzel | 452/108 |
| 4,037,294 | A | * | 7/1977 | Cowie et al. | 452/136 |
| 4,321,729 | A | * | 3/1982 | Ollik | 452/170 |
| 4,528,720 | A | * | 7/1985 | Young et al. | 452/106 |
| 4,955,110 | A | * | 9/1990 | Ogawa | 452/110 |
| 5,207,610 | A | * | 5/1993 | Ogawa | 452/110 |
| 6,001,011 | A | * | 12/1999 | Johnson | 452/65 |
| 6,361,426 | B1 | * | 3/2002 | Kragh | 452/161 |
| 6,572,466 | B1 | * | 6/2003 | Del Ser Gonzalez | 452/127 |
| 7,056,202 | B2 | * | 6/2006 | Pein | 452/161 |

FOREIGN PATENT DOCUMENTS

| EP | 0 710 445 | 5/1996 |
| WO | WO-99/13731 | 3/1999 |
| WO | WO-02/063967 | 8/2002 |

OTHER PUBLICATIONS

International Search Report Application No. PCT/EP2008/008212, dated Jan. 20, 2009.

* cited by examiner

*Primary Examiner* — Thomas Price
(74) *Attorney, Agent, or Firm* — Venable LLP; Robert Kinberg; Ryan M. Flandro

(57) ABSTRACT

The invention concerns an apparatus for receiving and fixing fish within a device for processing fish. The apparatus includes a trunk clamping device and a pectoral fin receptacle including at least two stops. The trunk clamping device is capable of being moved out of a receiving position into a clamping position and vice versa. An additional device is provided for fixing the fish trunk.

20 Claims, 2 Drawing Sheets

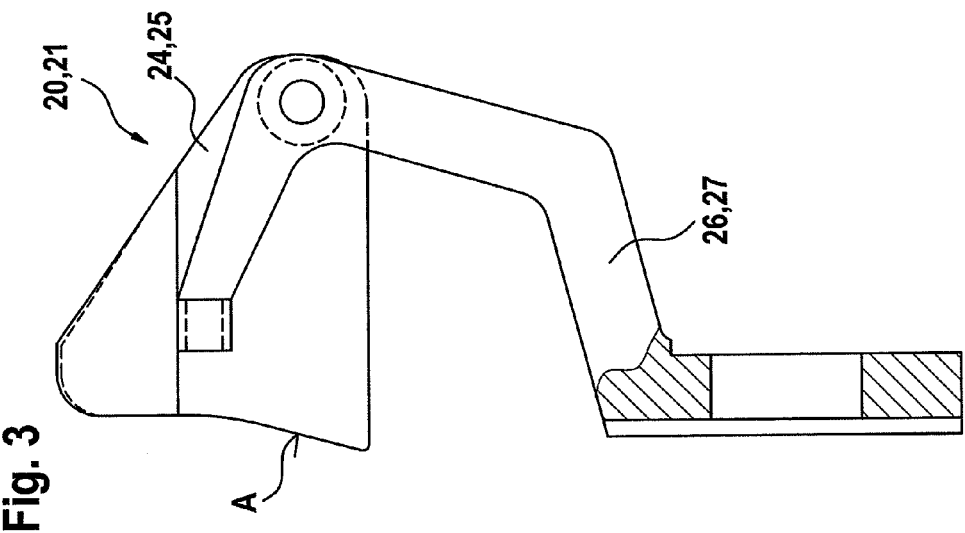
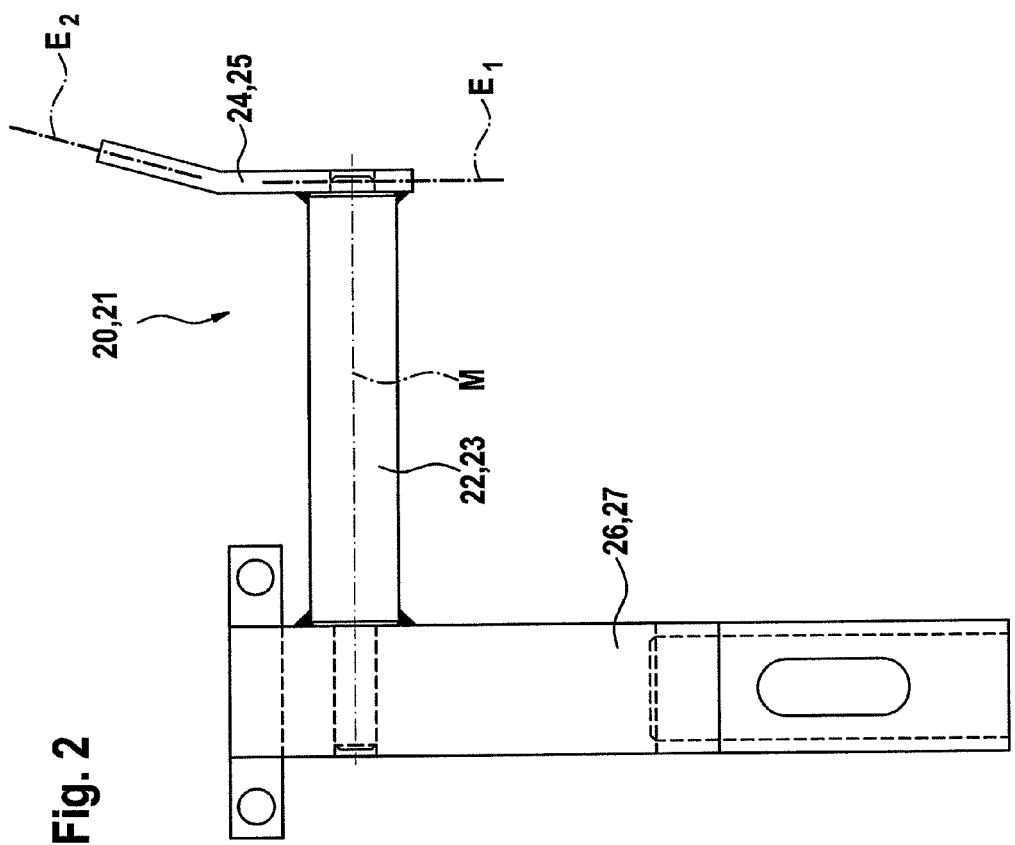

DEVICE FOR RECEIVING AND FIXING FISH WITHIN A DEVICE FOR PROCESSING FISH

CROSS REFERENCE TO RELATED APPLICATIONS

This application is a National Stage Application of PCT/EP2008/008212, filed Sep. 23, 2008, which designates the United States and claims the priority of German Patent Application No. 10 2007 048 176.6, filed on Oct. 2, 2007.

BACKGROUND

1. Field of Invention

The invention concerns an apparatus for receiving and fixing fish within a device for processing fish, comprising a trunk clamping means and a pectoral fin receptacle composed of at least two stops, the trunk clamping means being capable of being moved out of a receiving position into a clamping position and vice versa.

2. Related Art

Apparatuses of this kind are used particularly in the fish-processing industry and serve to hold the fish to be treated in a given position during processing. For the treatment or processing of fish it is of great importance that the fish lie and are held in a given position, preferably extended in their longitudinal extent, e.g. during cutting open of the throats, beheading, opening of the abdominal cavity, etc. In particular, the apparatus is used in conjunction with head supports and/or a head clamping means in order to support and fix the fish over its whole length, an unsupported region usually existing between the apparatus for receiving and fixing the fish on the one hand and the head support/head clamping means on the other hand. The combination of apparatus for receiving and fixing the fish and the head support/head clamping means on the other hand is, however, not mandatory.

Apparatuses for receiving and fixing fish are known. Such an apparatus can be found in WO 02/063967, for example. The apparatus for receiving and fixing fish which is shown there forms part of a slaughtering apparatus. The slaughtering apparatus comprises several fish receptacles forming a fish receiving drum. The rotationally driven fish receiving drum moves the fish which are fixed in the fish receptacles from one treatment station to the next. Naturally, the apparatus for receiving and fixing fish can also be designed as a single element or a component in other apparatuses, machines or the like.

In the apparatus for receiving and fixing the fish which is known from the WO document, the fish are laid with their back first, head to the right in the stationary fish receptacle, the trunk clamping means being opened to the maximum while the fish is laid in (receiving position), so that the fish is initially held only by the pectoral fin receptacle. In the event that a head support/head clamping means is provided, the head of the fish lies loosely on the head support without clamping. Otherwise the head of the fish would "hang" free. After actuation, the trunk clamping means is closed to fix the fish inside (clamping position). The fish is then fixed in the region of the trunk in front of the pectoral fins, seen from the tail. In other words, after being laid in the generic apparatus the fish are aligned along their longitudinal extent from the tail to the pectoral fins. If a head support/head clamping means is used, the region of the head is supported as well. However, for various reasons, for example the degree of freshness, deformation arising in rigor mortis or the like, the fish can be flexible, rigid, soft, curved, etc., as a result of which the region starting from the pectoral fins in the direction of the head or the region between the known trunk clamping means and the head support is not aligned in the longitudinal extent of the fish. This effect can be further reinforced by external circumstances such as e.g. a strong swell. A fish which is not fully aligned, however, makes subsequent treatment/processing difficult.

SUMMARY

It is therefore an object of the present invention to provide an apparatus for receiving and fixing fish which ensures continuous and reliable fixing of the fish in the direction of their longitudinal extent.

The above and other objects may be achieved by an apparatus including means for clamping a trunk of the fish and a pectoral fin receptacle including at least two stops, wherein, according to an embodiment of the invention, an additional means is provided for fixing the fish trunk. This may ensure complete fixing of the fish in a simple and reliable manner, so that the fish is always optimally aligned regardless of its consistency, its state, its shape, etc.

According to an embodiment of the invention, the additional means may include two clamping brackets arranged on opposite sides of the fish. As a result the fish may be fixed evenly in the direction of the longitudinal extent in the region of the trunk.

The additional means may be constructed and designed so as to abut against the fish trunk behind the pectoral fins, seen from the tail of a fish to be clamped. The region between the trunk and the head of the fish, which has been unsupported up to now, regardless of the use of a head support, may be supported and fixed reliably. In other words, this design makes it possible for fish which do not lie in the direction of the longitudinal extent, for example due to deformation in rigor mortis, to be pushed into the desired position and held in it.

The trunk clamping means may include a back support and two side jaws. Hence fixing of the trunk in front of the pectoral fins, seen from the tail, is possible in a particularly reliable manner.

The clamping brackets may be rigidly connected to the side jaws, in such a way that the clamping brackets are inevitably actuated by the side jaws. This may ensure that the fish trunk is uniformly and simultaneously clamped at different positions.

In another embodiment, each clamping bracket is composed of a support arm and a clamping element, the clamping element being adapted to the contour of the fish trunks. Thus it is made difficult for the fish or fish trunk to shift, so that the ideal fixing position can be reached safely and reliably.

BRIEF DESCRIPTION OF THE DRAWINGS

Further advantageous and/or appropriate features and embodiments are apparent from the subsidiary claims and the description. A particularly preferred embodiment is described in more detail with the aid of the attached drawings. The drawings show:

DETAILED DESCRIPTION

Figure 1:
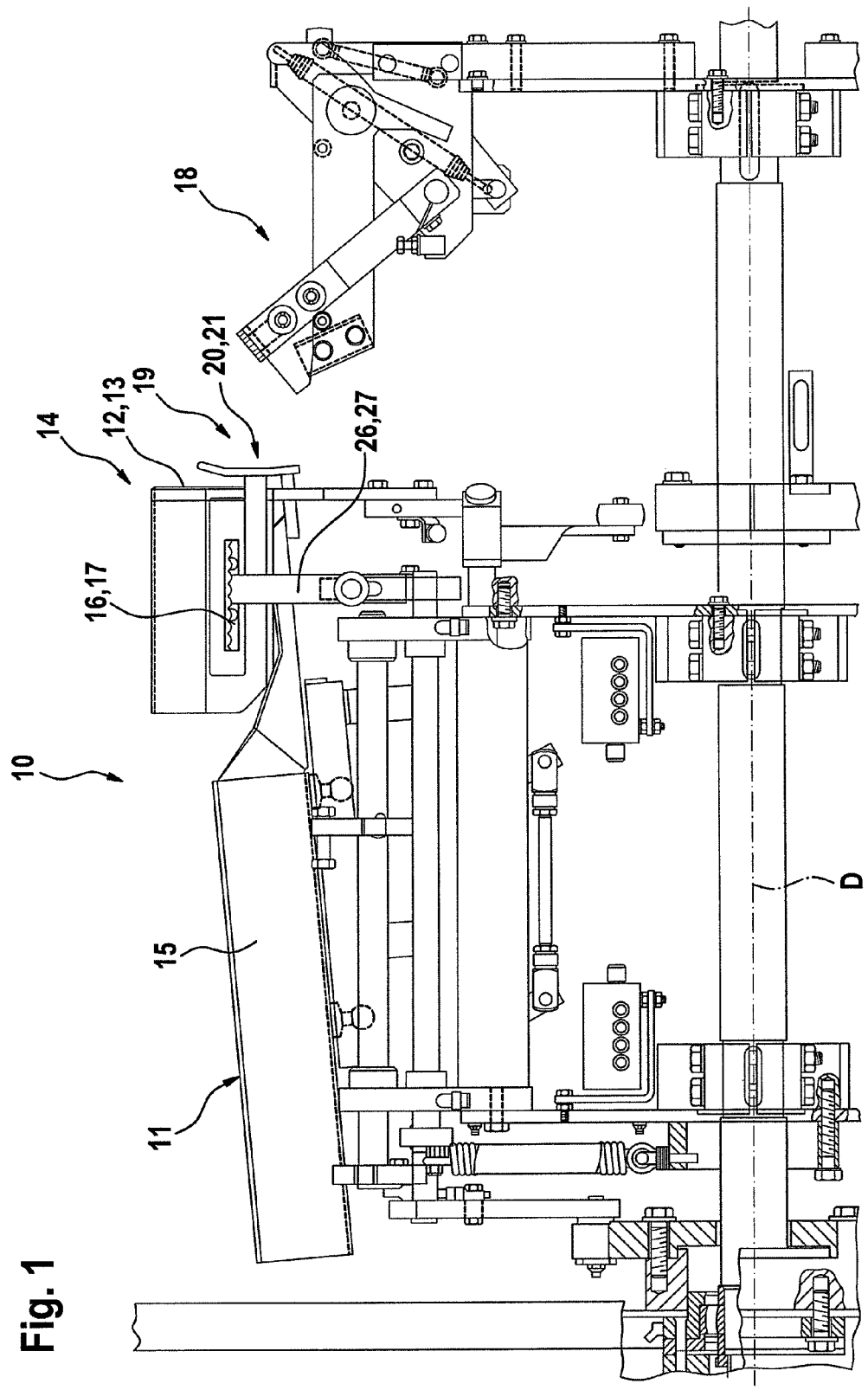
FIG. 1 a side view of an apparatus for receiving and fixing fish with a head support, FIG. 2 a side view of an additional clamping bracket, and FIG. 3 a front view of the clamping bracket according to FIG. 2.

The apparatus shown in the drawings serves to receive and fix a fish within a device for processing fish. This device usually comprises several such apparatuses. These apparatuses, which are also referred to as fish receptacles, are arranged in a circle and form a rotationally driven fish receiving drum. Naturally, the apparatus can also be designed for receiving and fixing other products and as a separate individual apparatus.

In FIG. 1 an individual apparatus 10 of this kind is shown in an overview. The apparatus 10 comprises a trunk clamping means 11 and a pectoral fin receptacle 14 composed of at least two stops 12, 13. The trunk clamping means 11, of which the structure, design and function can of course vary, can be moved out of a receiving position for the fish into a clamping position and vice versa. As an example, the trunk clamping means 11 is composed of a back support 15 and two side jaws 16, 17. The back support 15 and the side jaws 16, 17 are operatively connected to each other and form a so-called three jaw chuck. The actuating means can be designed in different ways. In the embodiment described, the trunk clamping means 11 is moved out of the receiving position into the clamping position by rotation of the fish receiving drum composed of several apparatuses 10. In the process the back support 15 is inevitably actuated by the side jaws 16, 17. To put it another way, the side jaws 16, 17 move towards each other for fixing the fish. Due to the movement of the side jaws 16, 17, the back support 15 is automatically lifted. Due to the synchronised movement of the side jaws 16, 17 on the one hand and the back support 15 on the other hand, the backbone of the fish is located approximately at the same height, regardless of the size of the fish. But as already mentioned, the trunk clamping means 11 can also be designed in another known manner. The pectoral fin receptacle 14 or the corresponding stops 12, 13 are arranged on both sides of the fish to be inserted, so as to lie opposite each other. They serve to position the fish to be inserted in its longitudinal direction. In other words, the fish is pushed with its ventral fins in the tail direction towards the stops 12, 13. In the construction shown, there is further provided a head support unit 18 consisting of head support and head clamping means, which is arranged at a distance from the apparatus 10 on the common axis. The head support unit 18, however, is shown only optionally and is not absolutely necessary.

In addition to the trunk clamping means 11 described, the apparatus 10 has an additional means 19 for fixing the fish trunk. The fixing means 19 can be constructed in one part or several parts. Furthermore there is the possibility that the means 19 can be controlled or actuated independently of the trunk clamping means 11 or is operatively connected thereto. In the shown apparatus 10, the means 19 comprises two clamping brackets 20, 21, the two clamping brackets 20, 21 being arranged on opposite sides of the fish. The two clamping brackets 20, 21 are constructed and designed in such a way as to abut against the fish trunk behind the pectoral fins, seen from the tail of a fish to be clamped. To put it another way, the clamping brackets 20, 21 engage the fish trunk in a region between the side jaws 16, 17 and an optional head unit 18.

In the embodiment shown, the clamping brackets 20, 21 are rigidly connected to the side jaws 16, 17. The fixed connection can be ensured by a screw connection, a welded joint or in some other ordinary way. Due to the rigid connection the clamping brackets 20, 21 are inevitably actuated by the side jaws 16, 17. This means that the clamping brackets 20, 21 follow every movement of the corresponding side jaw 16, 17 synchronously. The clamping brackets 20, 21 can also be arranged on the apparatus 10 independently of the side jaws 16, 17, the movements of clamping bracket 20, 21 on the one hand and side jaw 16, 17 on the other hand being capable of being synchronised in some other ordinary way.

Each clamping bracket 20, 21 is composed of a support arm 22, 23 and a clamping element 24, 25. The support arm 22, 23 is preferably cylindrical, but can have any other shape. The centre axis M of the support arm 22, 23 runs preferably perpendicularly to a pivot arm 26, 27 of the side jaws 16, 17 (see e.g. FIG. 2), but can also be at an angle to the pivot arm 26, 27. The support arms 22, 23 are preferably rigidly connected to the clamping elements 24, 25. But the clamping brackets 20, 21 can also be designed in one piece. The clamping elements 24, 25 which in the embodiment shown are designed as a metal sheet, are adapted to the contour of the fish trunks. As can be seen in particular from FIG. 3, one narrow side of a clamping element 24, 25 forms a contact surface A, which is curved or angled or otherwise adapted to the contour of the fish trunk. Naturally, the clamping elements 24, 25 can also be designed otherwise, for example as a clamping jaw, as a mandrel or the like.

The clamping elements 24, 25 or the metal sheets which form them span a first plane $E_1$. The centre axis M of the support arm 22, 23 runs optionally perpendicularly to the plane $E_1$. But this design can also vary by the fact that the metal sheet is angled, forming a second plane $E_2$.

Preferably, the plane $E_2$ bends in relation to the plane $E_1$ in the direction of the head support unit 18, that is, away from the side jaws 16, 17. But differently shaped metal sheets can be used as well.

With respect to the drawing according to FIG. 1, seen from the operator the fish is laid with its back first, head to the right in the stationary and open apparatus 10. When the fish is laid in, it is pushed with the laterally projecting pectoral fins in the tail direction towards the stops 12, 13, so that the fish is positioned in the longitudinal direction. If the apparatus 10 is now moved by rotation about an axis of rotation D into a first treatment position, the side jaws 16, 17 move towards each other. At the same time, correspondingly the clamping brackets 20, 21 move towards each other as well. Due to the movement of the side jaws 16, 17, the back support 15 is automatically lifted. The side jaws 16, 17 and the clamping brackets 20, 21 are moved towards each other until the fish is firmly clamped. The trunk of the fish is then fixed both in front of the pectoral fins and behind the pectoral fins, so that the fish has an optimum position independently of external influences and the state of the fish.

The invention claimed is:

1. An apparatus for receiving and fixing a fish within a device for processing fish, comprising:
   means for clamping a trunk of the fish, the trunk clamping means being capable of being moved out of a receiving position into a clamping position and vice versa;
   a pectoral fin receptacle including at least two stops; and
   additional means for fixing the trunk of the fish, the additional means being constructed to abut against the fish trunk behind pectoral fins of the fish, as seen from a tail of the fish.

2. The apparatus according to claim 1, wherein the additional means comprises two clamping brackets arranged on opposite sides of the fish.

3. The apparatus according to claim 2, wherein the trunk clamping means comprises a back support and two side jaws.

4. The apparatus according to claim 3, wherein the back support and the side jaws are operatively connected to each other.

5. The apparatus according to claim 3, wherein the side jaws are constructed to be movable towards and away from each other.

6. The apparatus according to claim 3, wherein the clamping brackets are rigidly connected to the side jaws, in such a way that the clamping brackets are inevitably actuated by the side jaws.

7. The apparatus according to claim 2, wherein each clamping bracket comprises a support arm and a clamping element.

8. The apparatus according to claim 7, wherein the clamping element is adapted to a contour of the fish trunk.

9. The apparatus according to claim 7, wherein the clamping element comprises a metal sheet.

10. The apparatus according to claim 9, wherein the metal sheet comprises a narrow side for abutment against the fish trunk.

11. The apparatus according to claim 9, wherein a center axis of the support arm runs perpendicularly to a plane spanned by the metal sheet.

12. The apparatus according to claim 11, wherein the metal sheet is angled, spanning a further plane.

13. An apparatus for receiving and fixing a fish within a device for processing fish, comprising:

a trunk clamp to clamp a trunk of the fish, the trunk clamp moveable between a receiving position and a clamping position and vice versa;

a pectoral fin receptacle including at least two stops; and a clamping bracket to fix a trunk of the fish, the clamping bracket being constructed to abut against the fish trunk behind pectoral fins of the fish, as seen from a tail of the fish.

14. The apparatus according to claim 13, wherein the clamping bracket comprises two clamping brackets arranged on opposite sides of the fish.

15. The apparatus according to claim 14, wherein the trunk clamp comprises a back support and two side jaws defining a three-jaw chuck.

16. The apparatus according to claim 15, wherein the back support and the side jaws are operatively connected to each other.

17. The apparatus according to claim 15, wherein the side jaws are movable towards and away from each other.

18. The apparatus according to claim 15, wherein the clamping brackets are rigidly connected to the side jaws such that the clamping brackets are actuated by the side jaws.

19. The apparatus according to claim 13, wherein the clamping bracket comprises a support arm and a clamping element.

20. The apparatus according to claim 19, wherein the clamping element comprises a metal sheet, wherein a center axis of the support arm runs perpendicular to a plane spanned by the metal sheet, and wherein the metal sheet is angled, spanning a further plane.

* * * * *